March 29, 1938.   R. D. HARDY ET AL   2,112,401
APPARATUS FOR COKING SOLID FUEL BRIQUETTES
Filed Oct. 31, 1935   3 Sheets-Sheet 1
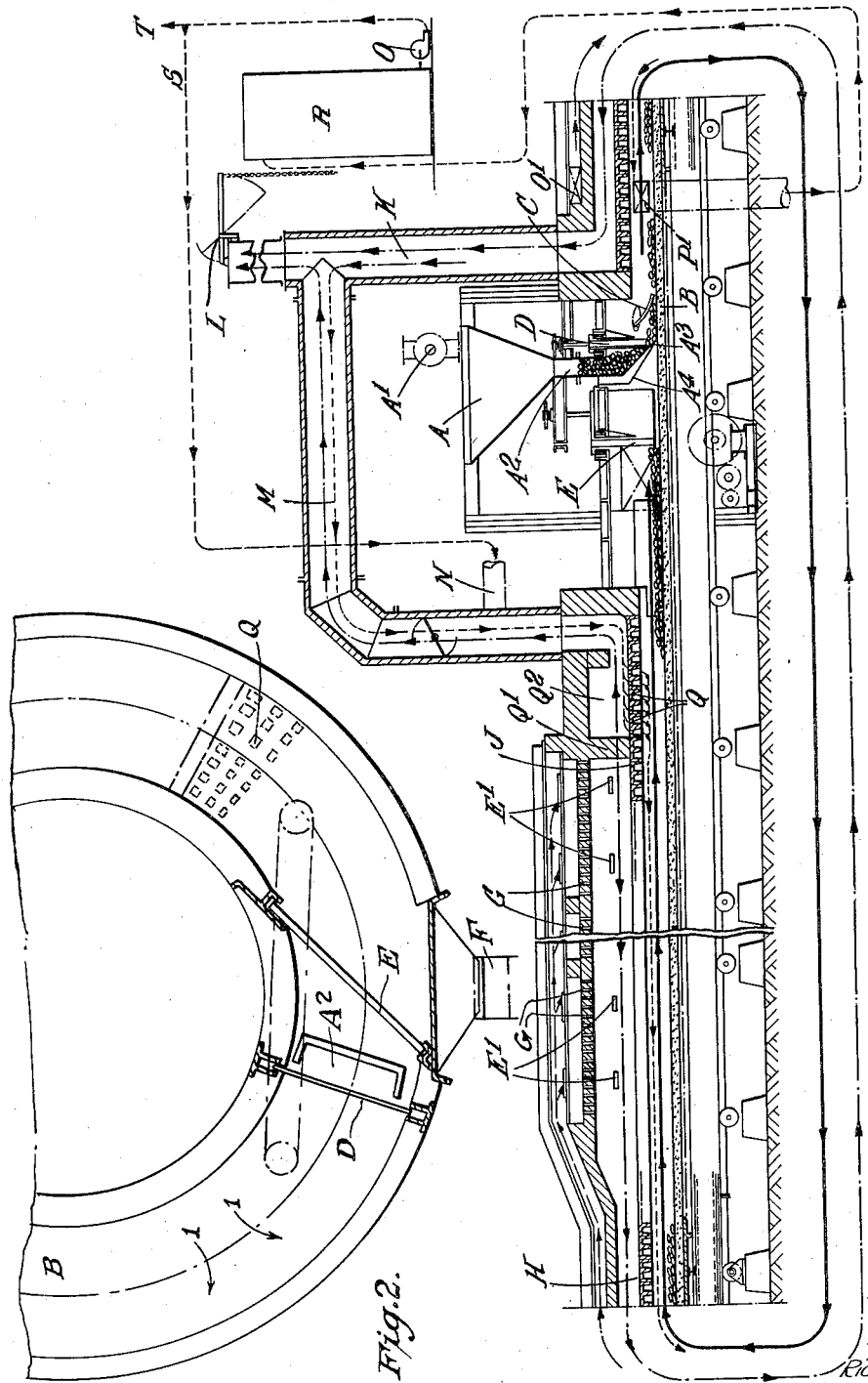
Inventors
Richard D. Hardy
Clifford Machen
Eric H. G. Fram
Cushman, Darby & Cushman
Attorneys

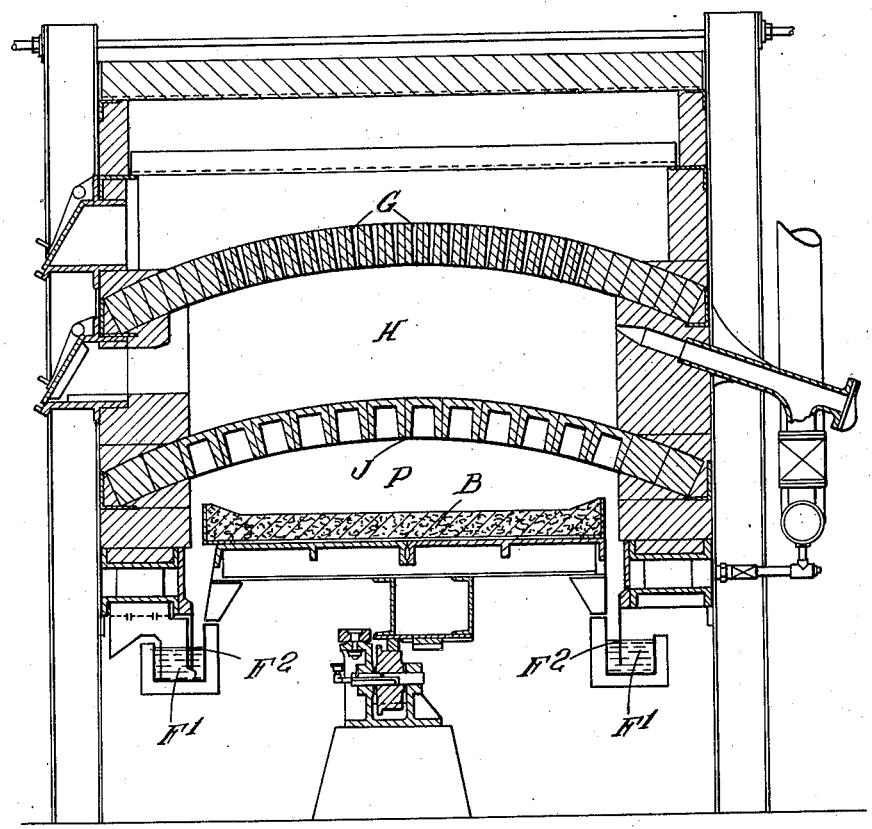

March 29, 1938. R. D. HARDY ET AL 2,112,401
APPARATUS FOR COKING SOLID FUEL BRIQUETTES
Filed Oct. 31, 1935 3 Sheets-Sheet 3

Inventors
Richard D. Hardy,
Clifford Machen,
Eric H. G. Fram,
Attorneys.

Patented Mar. 29, 1938

2,112,401

UNITED STATES PATENT OFFICE 2,112,401

APPARATUS FOR COKING SOLID FUEL BRIQUETTES

Richard Doughty Hardy, Clifford Machen, and Eric Harold George Aram, Westminster, London, England, assignors to British Coal Distillation Limited, London, England, a British Company Application October 31, 1935, Serial No. 47,696
In Great Britain November 9, 1934

6 Claims. (Cl. 202—117)

This invention relates to apparatus for the heat treatment of solid agglomerated materials, such as briquettes, or to the distillation or heat treatment of solid carbonaceous materials being hereinafter termed briquettes.

According to the present invention the briquettes which are to be baked, distilled or subjected to heat treatment are fed onto a rotating annular hearth or grate, the rotatable hearth or grate being preferably surmounted by a muffle which forms the heating chamber so that if desired the heating gases may be kept out of contact with the material undergoing treatment on the rotatable hearth or grate, situated below the muffle; means being provided for discharging the briquettes after heat treatment, and means being also provided for drawing off the volatile constituents evolved therefrom during the heat treatment. Alternatively, the briquettes may be heated by direct contact with hot gas. The rotatable hearth or grate, which may be annular in plan, is operated in any suitable manner, for example, by means of an electric motor, and variable speed driving gear may also be provided so that the speed of rotation of the rotatable hearth or grate can be varied in accordance with the nature of the briquettes undergoing heat treatment, or to suit working conditions.

The muffle which is provided for the indirect heating of the briquettes, may be in the form of a double roof recuperator, the air for combustion being preheated in the double roof recuperator and a low pressure fan being provided for delivering the air to the combustion chamber of the muffle. The combustion chamber situated over the muffle may be divided so that the flame travels towards each end of the furnace, a portion travelling to the discharging end so as to maintain an even temperature, and a further volume travelling towards the charging end to heat up the incoming charge. The heating arrangements, however, may be such that a progressively increasing temperature is obtained from the point at which the solid material is charged into the furnace to the point where the briquettes are discharged. Provision is made for drawing off at one or more points, the volatile constituents driven off from the briquettes during the heat treatment; a suction fan or its equivalent, being provided at the exit opening for the said volatile constituents, the said exit opening being preferably situated towards the zone of highest temperature in the chamber containing the rotatable hearth. Suitable seals, such as water seals or seals constituted by a solid material such as coal dust or sand, are provided to prevent the escape of the gases and the volatile constituents evolved from the briquettes during the heat treatment. Provision may also be made, for example, by means of chambers located on each side of the rotatable hearth, for admitting to the chamber in which the rotatable hearth is situated, a controlled volume of inert or heating gases for the purpose of assisting the evolution of vapors or gases from the briquettes and maintaining in suspension the volatile constituents driven off from the briquettes, while also vaporizing any heavy or tarry constituents which may have settled on the rotatable hearth or grate, thus carrying them in suspension so that they do not reach their dew point until they pass through the exit opening or openings leading from the furnace to the gas or vapor collectors, condensers or the like. At the charging end of the furnace, which may be situated at a point in the rotatable hearth chamber where the temperature is lowest, means are provided for feeding onto the rotatable hearth or grate the briquettes which are to undergo heat treatment. The charging device may be constituted by a sealed hopper into which the briquettes are fed through a rotary valve or other sealing device, the hopper being preferably provided internally with a spiral guide or feed so as to prevent fracture or damage to the briquettes in their movement through the said hopper from the inlet to the discharge end thereof, passing by gravity from the hopper in regular and even quantities onto the rotating furnace hearth. The outlet end of the hopper leading from the feeding bunker to the rotatable hearth may be water cooled and an inclined and water cooled plate, facing the direction of rotation of the rotatable hearth or grate, may be provided for the purpose of guiding the briquettes as they pass from the hopper onto the rotatable hearth. A water cooled slide may also be provided associated with the lower end of the aforesaid inclined guiding plate, so that, by raising and lowering the said slide intermittently or otherwise, the depth of solid material or the number of superimposed briquettes which pass onto the rotatable hearth, can be regulated. For example, it has been found that more advantageous results are obtained if only two superimposed layers of briquettes are allowed to pass to the rotatable hearth. An indicating device may be provided in advance of the aforesaid feeding device, constituted, for example, by a hinged plate, which plate, according to the degree of its angular displacement by the briquettes fed onto the top of the rotatable hearth, will show on the indicator the number of superimposed briquettes or the depth of the solid carbonaceous materials situated on the rotatable hearth and thereby indicate to the operator the necessity or otherwise of varying the position of the vertically adjustable slide arranged in front of the inclined plate of the feeding device.

The briquettes, after traversing or being carried round from the inlet to the discharge point of the chamber containing the rotatable grate or hearth, may be automatically discharged in any suitable manner, for example, by means of an inclined and water cooled plate or scraper disposed transversely of the rotatable hearth and situated towards the charging point of the furnace, which water cooled plate or scraper moves or guides the briquettes from the rotatable hearth to a discharge opening.

In order that the said invention may be clearly understood and readily carried into effect the same will now be described more fully with reference to the accompanying drawings, which show by way of example one method and apparatus for carrying the invention into practice, and in which, Figure 1 is a developed partly diagrammatic vertical section through the furnace on the line 1—1 of Figure 2.

Figure 2 is a partly diagrammatic plan view of the rotatable hearth, and

Figure 3 is a transverse cross-section through the furnace shown at Figure 1.

Figure 4:
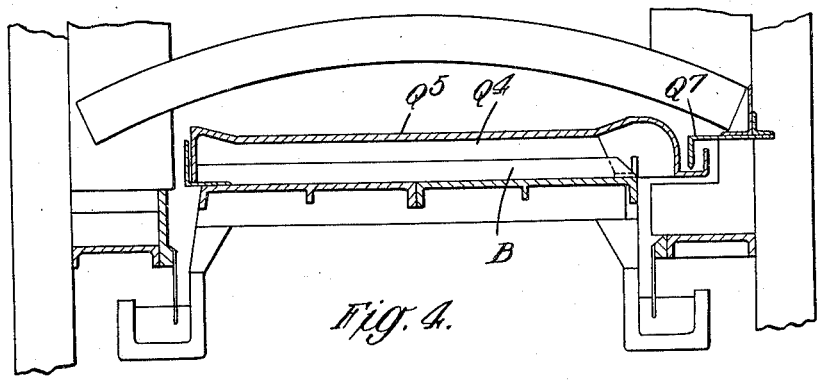
Figures 4, 5, 6 and 7 are transverse sections taken at different points of the rotatable hearth, showing a modified arrangement in which provision is made for heating the briquettes or carbonaceous material from above and from below.

Referring more particularly to Figures 1, 2 and 3, the briquettes which are to be treated are fed into a hopper A. The said hopper A may be provided internally with a spiral guide or feed (not shown) so as to prevent fracture or damage to the briquettes, the briquettes passing from the hopper A in regular and even quantities through a chute $A^2$ onto the rotating furnace hearth B. The outlet end $A^3$ of the feed hopper A is provided with an inclined water cooled plate $A^4$ which faces the direction of rotation of the rotatable hearth B and serves to guide the briquettes as they pass from the hopper A onto the rotatable hearth B. D is a water cooled level regulating door associated with the lower end of the inclined guiding plate $A^4$ so that by raising the lower end of the water cooled door D by suitable mechanism the depth of solid material or the number of superimposed briquettes which pass onto the rotatable grate or hearth B can be regulated. C is an indicating device located in advance of the feeding device $A^4$ constituted by an inclined plate, which, according to the degree of angular displacement by the briquettes fed onto the top of the rotatable hearth B, shows on an indicator the number of superimposed briquettes or the depth of solid carbonaceous material situated on the rotatable hearth B, and thereby indicates to the operator the necessity or otherwise of varying the position of the vertically adjustable slide D arranged in front of the inclined plate $A^4$ forming part of the feeding device. The briquettes, after traversing or being carried from the inlet $A^2$ and being subjected to direct, indirect or combined direct and indirect heating, are discharged from the hearth B in any suitable manner. For example, and in the embodiment shown, the discharging device is constituted by an inclined or water cooled plate or scraper E disposed transversely of the rotatable hearth B and situated behind the charging end $A^2$, this water cooled plate or plough serving to move or guide the briquettes from the rotatable hearth B to a discharge opening F, the discharge opening being fitted with a hopper and valve.

O' is an air inlet and P' is a gas outlet.

Guide plates may be fitted on the side walls of the chamber containing the rotatable hearth in advance of the said plate or scraper E, and the scraper E may be fitted with an inclined surface or plough at the lower edge thereof, which will automatically lift the briquettes from the rotatable hearth, and, due to the rotation of the rotatable hearth, discharge the same laterally from the furnace. The discharged briquettes or the solid carbonaceous material may pass into a container whence the briquettes or the solid carbonaceous materials are delivered in regular quantities by a rotary valve or other sealing device into a water bosh or tank where they are quenched. Alternatively, and in lieu of using an inclined plate such as E, extending transversely of the rotatable hearth for the purpose of discharging the briquettes from the hearth, the scraper which automatically discharges the briquettes may consist of a chain provided with a number of scraper attachments, the chain being driven by sprockets which in turn are driven by bevels and chains from the rotating furnace hearth. From the said container the briquettes may be fed through a rotary valve or star wheel into a water trough or taken elsewhere. The sides of the chamber containing the charging and discharging gear are cased in, as aforesaid, to prevent the evolved gases from leaking or escaping except at the desired point or points of collection, and the aforesaid casing may be equipped with suitable gas tight inspection doors to allow access to the charging feed and discharging device as, and when, required.

The rotatable hearth may be constituted by a series of castings bolted together and fitted with a circular track rail running on a number of rollers situated underneath the hearth. The rollers are mounted in suitable roller bearings, carried by cast iron housings. To prevent the escape of gases from the furnace the base of the rotatable hearth bogie B may be fitted with dip plates $F^2$ which enter a water or other gas seal $F''$, the latter being supported by piers spaced at regular intervals around the circumference of the furnace. Alternatively, the dip plates $F^2$ may be secured to the stationary muffle walls, and the seal channel carried on the rotating bogie, in which case, a fixed plough removes any solid material at one fixed point, the sealing liquid being allowed to overflow into a collecting channel formed in the foundation of the muffle.

A continuous rated motor may be provided for driving the hearth. The motor may be directly coupled to a double type spur gear speed reducer mounted upon a cast iron base plate fitted with an outboard bearing. A flexible coupling may connect the motor with the speed reduction gear. The reduction gear may drive an eccentric which is connected to a ratchet driving arm engaging a rack fitted to the underside of the rotating hearth. The whole of the said drive is suitable for operating under continuous conditions as it is especially robust in construction and requires little attention. The speed of rotation of the hearth can be varied to suit working conditions.

During the passage of the briquettes around the furnace they are subjected to a gradually increasing temperature whereby the whole of the pitch volatiles are driven off, these being passed through coolers and the liquids condensed. The heat is applied to the briquettes as follows:—

Producer gas is admitted at ports E' to combustion chamber H where it is burned by air admitted through the perforated bricks G. The combusted gas passes along the flue H in counterflow to the movement of the briquettes, giving up radiant heat thereto through the muffle arch J. The spent gas, after passing completely around the furnace reaches the stack K. Here the spent gas is passed to atmosphere through the valve L if indirect heating from above only is required. If it is desired to apply direct heat to the briquettes, then the valve L is closed and the spent gas passes along the bye-pass pipe M where, at N, it meets and mixes with a portion of the stripped cooled gas drawn from the furnace by the exhauster O. This stripped cooled gas serves to attemperate the spent hot gas, and the gaseous mixture at the desired temperature, is passed into the muffle chamber P by the ports Q. A wall or baffle Q' divides the combustion chamber, and forms a mixing chamber $Q^2$ above the ports Q. This attemperated gas is then drawn wholly around the furnace in direct contact with the briquettes mixing with the pitch volatiles and, drawn by the exhauster O, passes through the condenser R where the liquid products are condensed, and then being driven by the exhauster along the pipe S. The valve T serves to pass to atmosphere that portion of this stripped gas which is not required for attemperating the spent hot gas.

The air may be preheated by passing between the upper crowns of the furnace, and may enter the combustion chamber through small holes equally spaced apart in the lower crown of the furnace. Gas is introduced into the furnace immediately below the perforate crown by means of downtakes, and forms a more or less quiescent blanket below the crown. The air enters the combustion chamber in the form of numerous jets which descend through the above mentioned gas blanket. Combustion takes place, the flame being generated simultaneously over the entire length and width of the heating zone. Practically the whole of the heat generated in the flame is carried downwards towards the muffle crown and upward radiation of the flame tends to heat the gas and air above it. Consequently, a large portion of this heat is returned to the furnace.

The arrangement and detail of the outlets can be modified to suit the connections to a dryer or the like where the waste heat can be utilized.

It has been found that, during the coking of briquettes or the distillation of carbonaceous materials, if a charge of carbonaceous material or briquettes of given thickness is heated from one side only, the time required for the heat to penetrate the charge is considerably greater than twice that which is required when the same charge is heated from both sides.

According to a modification of the present invention, and in order to increase materially the rate at which the briquette layer or the carbonaceous materials can be passed through the heating chamber by heating the layer on both sides the briquettes are fed upon a false hearth $Q^5$ located above a lower hearth (similar to B) so that the briquettes or carbonaceous materials are heated from above and below.

Figure 5:
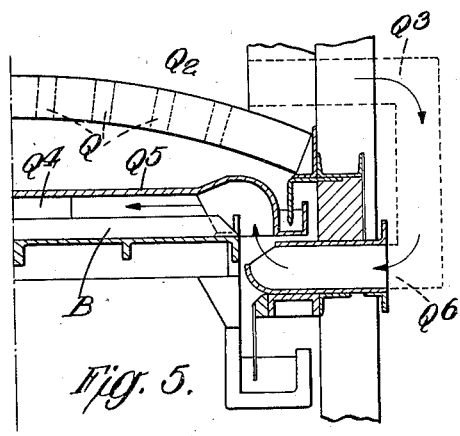
Figure 6:
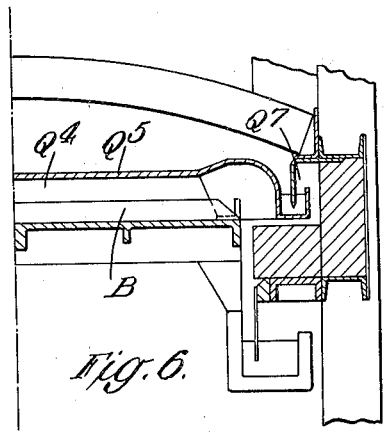
Figure 7:
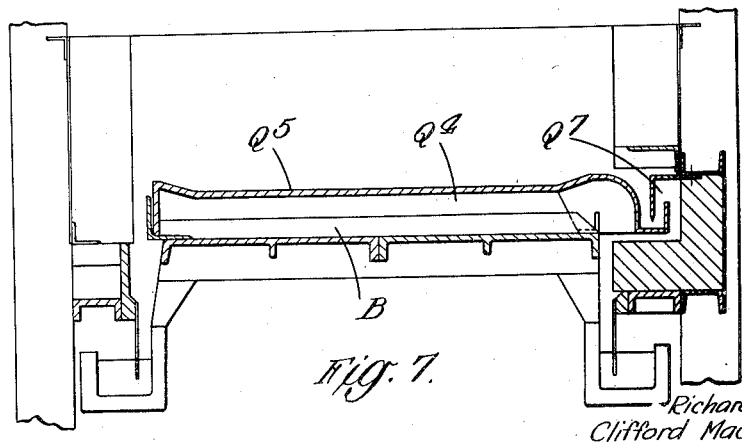

Figures 4, 5, 6 and 7 show these modified arrangements. To this end, the spent flue gases passing to the stack K are drawn off through the pipe M and attemperated as required at the point N before they pass into the gas mixing chamber $Q^2$. Thence they pass by a brick-lined duct $Q^3$ into a port $Q^6$ situated at the hearth level B, and communicating with a hollow space $Q^4$ formed between the existing hearth B with its water seals as previously described, and a false hearth $Q^5$; the hot gases pass round this hollow space in both directions and are exhausted to atmosphere through a port (not shown), but similar to the inlet port $Q^6$ and situated diametrically opposite thereto and connected with a suitable stack such as K. This stack is provided with an adjustable damper.

$Q^7$ is a rotating sand seal which prevents distillation gases mixing with the gases which pass to the underheating chamber $Q^4$.

When combined indirect and direct heating is required, the damper is closed, or partly closed, and then all or part of the spent attemperated gases are caused to pass from the mixing chamber $Q^2$ through ports Q into the muffle chamber as previously described.

It will, however, be seen that by adjusting the relative pressures in the mixing chamber $Q^2$ and in the muffle chamber, by means of the valve L and an exhauster O, it is possible to cause the attemperated spent gases in the chamber $Q^2$ to follow either desired path, that is to say, either all the gases may pass through the hollow hearth and then to atmosphere, i. e., indirect heating, or all through the ports Q and then through the muffle, i. e. indirect and direct heating, or a portion may be passed through the hollow hearth $Q^4$ and then to atmosphere and a portion through the ports Q and then through the muffle. This latter method is mainly direct heating but allows a small volume of gas to pass in direct contact with the briquettes or carbonaceous material so as to act as a carrier for the distillation products. This method of carrying all, or a portion of the spent gases beneath the hearth prevents heat loss from the bottom of the briquette or carbonaceous layer which, even when a most efficient insulator is used is bound to occur, and materially decreases the length of time required for carbonizing a briquette or other carbonaceous layer of given thickness.

The aforesaid apparatus is especially suitable for the treatment of briquettes made from the semi-coke obtained from the low temperature distillation of coal with the aid of a suitable binding medium, such as pitch, the baking or heating operation in the aforesaid rotatable hearth muffle furnace rendering the briquettes smokeless and at the same time hard, dense and not liable to fracture. Previous proposals for baking briquettes have been open to the objection that because the binding material, due to the heat treatment, tends to fuse, they lose their shape and crack or fracture so that the output of briquettes of uniform strength and shape is reduced. The usual method of baking, also produces a very large proportion of fractured or damaged briquettes but by the present process and apparatus, and on account of the fact that, during the baking operation, the briquettes are relatively stationary, any liability to fracture is practically eliminated, while the feeding and discharge arrangements are such as also to eliminate or minimize any tendency of fracture, damage or breakage at these points.

We claim:

1. An annular furnace for heat treating briquettes comprising side walls and a top, a perforate crown spaced substantially below said top, its ends terminating in said side walls, a muffle arch disposed below the perforate crown and spaced therefrom a substantial distance with its ends terminating in said side walls, an annular rotatable horizontally disposed hearth below the muffle arch and having its edges spaced from the furnace walls and sealing means secured to said rotatable hearth for sealing the bottom of the furnace.

2. An annular furnace for heat treating briquettes comprising side walls and a top, a perforate crown spaced substantially below said top, its ends terminating in said side walls, a muffle arch disposed below the perforate crown and spaced therefrom a substantial distance with its ends terminating in said side walls, an annular rotatable horizontally disposed hearth below the muffle arch and having its edges spaced from the furnace walls and sealing means secured to said rotatable hearth for sealing the bottom of the furnace, said sealing means comprising depending trough-shaped receptacles adapted for sealing engagement with depending plates secured to the inner walls of said furnace.

3. An annular furnace for heat treating briquettes comprising side walls and a top, a perforate crown spaced substantially below said top, its ends terminating in said side walls, and means for introducing air between said top and perforate crown, a muffle arch disposed below the perforate crown and spaced therefrom a substantial distance with its depending ends terminating in said side walls, and means for introducing combustible gases between said perforate crown and said muffle arch, an annular rotatable horizontally disposed hearth below the muffle arch for the reception of briquettes and having its edges spaced from the furnace walls, sealing means secured to said rotatable hearth for sealing the bottom of the furnace and means for withdrawing the generated gases from the space between the muffle arch and the bottom of the furnace.

4. An annular furnace for heat treating briquettes comprising an air preheating chamber, said chamber being provided with means for the introduction of air, a combustion chamber immediately below said preheating chamber and concentric therewith, the walls of said combustion chamber being provided with spaced apertures for the introduction of combustible gases, said combustion chamber and said preheating chamber being separated by a perforate crown wall, a muffle chamber immediately below said combustion chamber and commensurate therewith and separated therefrom by an imperforate muffle arch, and an annular horizontally disposed rotatable hearth positioned to move through said muffle chamber, said hearth being provided with means on its under surface for sealing the muffle chamber from the atmosphere.

5. An annular furnace for heat treating briquettes comprising an air preheating chamber, said chamber being provided with means for the introduction of air, a combustion chamber immediately below said preheating chamber and concentric therewith, the walls of said combustion chamber being provided with spaced apertures for the introduction of combustible gases, said combustion chamber and said preheating chamber being separated by a perforate crown wall, a muffle chamber immediately below said combustion chamber and commensurate therewith and separated therefrom by an imperforate muffle arch, and an annular horizontally disposed rotatable hearth positioned to move through said muffle chamber said hearth being provided with means on its under surface for sealing the muffle chamber from the atmosphere, said sealing means comprising depending trough-shaped receptacles adapted for sealing engagement with depending plates secured to the inner walls of said furnace.

6. An annular furnace for heat treating briquettes comprising an air preheating chamber, said chamber being provided with means for the introduction of air, a combustion chamber immediately below said preheating chamber and concentric therewith, the walls of said combustion chamber being provided with spaced apertures for the introduction of combustible gases, said combustion chamber and said preheating chamber being separated by a perforate crown wall, a muffle chamber immediately below said combustion chamber and commensurate therewith and separated therefrom by an imperforate muffle arch, and an annular hollow horizontally disposed rotatable hearth positioned to move through said muffle chamber and means for circulating heated gases through said hollow hearth, sealing means between said hollow hearth and the muffle chamber, and sealing means secured to said rotatable hearth for sealing the muffle chamber from the atmosphere, and means for withdrawing the generated gases from said muffle chamber.

RICHARD DOUGHTY HARDY.
CLIFFORD MACHEN.
ERIC HAROLD GEORGE ARAM.